Patented Jan. 9, 1934

1,942,770

UNITED STATES PATENT OFFICE 1,942,770

FLY ASH STRUCTURAL MATERIAL

Harry C. Peffer and Paul W. Jones, La Fayette, Ind., assignors to Rostone, Incorporated, La Fayette, Ind., a corporation of Indiana No Drawing. Application October 17, 1932
Serial No. 638,259

42 Claims. (Cl. 18—47.5)

This application is in part a continuation of our application Serial No. 572,214 filed October 30, 1931.

Our invention includes a novel structural material the principal constituent of which is the mineral refuse produced in the burning of powdered coal and technically known as "fly ash" as hereinafter defined, and the method of making such product; such product having a high degree of strength, resistance to weather and other valuable qualities.

When coal is burned in the usual manner on a grate or stoker, the refuse mineral matter of the coal is partially and imperfectly fused into a lumpy more or less porous mass, enclosing unfused mineral material, coke, unburned coal, etc., usually designated as ashes or clinker: Such refuse differs from the fly ash which we employ both in its physical form and contained impurities.

Powdered or pulverized bituminous coal is now extensively used in large power plants, because of the ease of control and high efficiencies obtainable. In such plants the coal is reduced to a fineness of about 100-200 mesh per inch and injected into the furnace by a blast of air, and is directly consumed and the non-combustible mineral content in the form of minute particles of microscopic dimension which are not deposited in the flues are carried off by the hot gases of combustion and are discharged with the waste gases and usually precipitated on the adjacent country and become a serious nuisance. This "fly ash" is exceedingly objectionable because it is so very fine that it is practically impossible to exclude it from buildings, and it is injurious to health and also injurious to vegetation.

The aforesaid "fly ash" differs physically and chemically from that produced by ordinary combustion processes: The fly ash derived from the combustion of a certain pulverized bituminous coal showed by analysis,—45.1% silica, 21.34% alumina, 15.08% $Fe_2O_3$, 3.16% FeO, 6.85% CaO, and a small percent of alkali.

By the term "fly ash" as hereinafter used we refer to the non-combustible glassy mineral matter obtained during the combustion of pulverized coal, in which process the non-combustible matter is virtually fused by the heat of combustion of the fuel, while suspended in the current of hot gases of combustion, and is transformed into microscopic particles of glassy material which are carried by the combustion and discharged out of the stack constituting a very fine dust-like material which, unless precipitated or collected by special means, settles very slowly in the neighborhood of the furnace. With this glassy material may be some oxides, such as iron and minor constituents including small percentages of carbon.

It is to be noted that such fly ash differs from all other forms of refuse from coal in its extreme state of subdivision, the form of its particles, and, due to its being a fusion product, its chemical and mineralogical composition: also, it is to be noted that due to the immense surface resulting from its extremely fine state of subdivision, its reactivity is greatly increased. This "fly ash" being in an extremely fine state of subdivision may be used in the same physical state as it is produced without further size reduction.

Hereinafter the term "fly ash" as used herein is meant to be understood and taken as referring to the aforesaid material.

We have found that an alkaline earth base, such as lime, will react chemically with such fly ash to produce a structural material of excellent strength, relatively low density if desired, and weather resisting properties. In practice, generally speaking, we add to such fly ash an alkaline earth base, preferably lime, in quantity depending on the composition of the ash (5% to 15% being ordinarily sufficient), and sufficient water to facilitate easy working, and mix them thoroughly. The incorporated mass is then formed into desired shapes, preferably by suitable mechanical means. These shapes without drying are then indurated by heating same (preferably in presence of water vapor) while retaining the essential reacting water therein until the desired chemical reaction occurs. Steam may be used for this purpose, and may be brought from an outside source, or generated within the vessel in which the shapes are placed until the reaction occurs.

We have discovered that the chemical reaction can be facilitated and the physical properties of the product enhanced by preliminarily treating the fly ash, if necessary, as hereinafter set forth.

Slaking

Some "fly ash" contains unslaked substances, such as quicklime etc., which might cause injury to the product in the final step of the process. To prevent any detrimental effect which might be caused by such substances, the fly ash may be slaked, preferably by heating in the presence of moisture, or aging the fly ash in dampened condition at room temperature. In some cases the slaking may be effected simultaneously with the tempering hereinafter described.

Tempering

The fly ash particles may have adsorbed on their surfaces a film of gases and/or non-aqueous liquid which adheres very tenaciously. To insure the proper chemical reaction in our process, and the desired product, this adsorbed film must be displaced from the particles and the surfaces of the particles thoroughly wetted so that such wetted particles when brought into contact with wetted particles of an alkaline earth base will, under proper conditions, (because of increased surface contact) react more quickly and thoroughly. To eliminate the absorbed film we "temper" the fly ash to cause displacement of such film on the particles and its replacement by water or a medium which will facilitate the desired reaction.

"Tempering" as herein used may be defined briefly as an operation or sequence of operations which immediately or ultimately causes thorough wetting of the particle surfaces by water or a medium conducive to complete reaction and a satisfactory product. Unless the particles are properly tempered when necessary the resulting product will be unsound due to lamination, high porosity, and low tensile and crushing strength.

The tempering may be accomplished by working, kneading or attrition of the mass, to which sufficient liquid has been added, so as to shear or rub off from the surfaces of the individual particles the adsorbed film and displace the same by water. This may be accomplished by means of wet pans, kneaders or other appropriate machines.

The extent of tempering may vary with the chemical composition and physical condition of the fly ash and require modifications in the tempering step. By the addition of a small proportion of organic or inorganic substances in solution (such for instance as glycerine) to the water or wetting liquid surface tension is reduced and wetting facilitated but mechanical means are found to be more practicable in most cases. In some cases the surface tension reducing medium may be used in connection with the mechanical treatment.

If the mass so treated is allowed to stand protected from evaporation, for 12 hours or more, depending on the original condition of the fly ash, the particles will be uniformly wetted. The tempering operation may be accelerated, by exposing the moistened fly ash for a time to moist heat as a preliminary to the final tempering operation.

The tempering steps above mentioned are mentioned only as examples and not as limiting us to any specific procedure, as we believe ourselves to be the first to discover the effect of adsorbed films on fly ash and the advantages of the removal thereof and replacement by a wetting medium.

Efflorescence

Some fly ash contains substances containing sulphur and/or other substances which produce salts that if present in the product would tend to dissolve under natural occurring conditions and deposit in white crystalline form on the surface of the product, which action is commonly called efflorescence and is very objectionable. We have found that methods commonly believed applicable to the elimination of efflorescence, are unsatisfactory and inefficient in connection with fly ash. We have however discovered that efflorescence can be eliminated or prevented by adding to the mass a small proportion of resin, preferably rosin. This successfully controls efflorescence, absorption and absorption rate; which are important in producing the desired product of varying application and controllable physical properties.

The proportions of ingredients used will vary somewhat according to the fly ash employed to produce the best physical properties. As an example we have found 100 pounds dry weight fly ash, 10 pounds lime, one-half pound pulverized rosin, and 15 pounds water produced a satisfactory product.

We have also found that other resins, waste sulphite liquor residue, and vegetable sugars can be used in place of rosin to prevent efflorescence and control absorption and absorption rate. The resulting reaction likewise produces a water resisting, absorption controlling substance.

Processes (1) In one practical utilization of our invention (using fly ash obtained from a large powdered bituminous coal burning plant in the vicinity of Detroit), the fly ash was (a) moistened; (b) to such moistened fly ash lime and rosin, or other suitable efflorescence preventing substance, was added; (c) the mass was then thoroughly tempered as above explained; (d) the tempered mass then formed into shapes; and finally (e) the shapes without drying were indurated by moist heat while retaining the essential reacting water until the desired chemical reaction or reactions took place and the desired product obtained.

In the above instance to indurate we used steam at a temperature of about 320° F. for a period of two hours after which no further treatment was necessary for obtaining the finished product. As fly ash from various sources differs in composition, we do not limit ourselves, either in the matter of time or temperature, but use the above merely by way of illustration. Complete reaction between the fly ash and the alkaline earth base is evidenced by the absence of free lime in the final product, and the formation of a stone-like material, fine grained readily workable, and having a compressive strength of about eight thousand pounds per square inch.

(2) In some cases we mix the dry fly ash with lime and rosin, or other suitable efflorescence preventing substance, then add water and temper the mixture as above described, disintegrate the tempered mass, shape, and indurate it as above described.

(3) With some fly ash to facilitate tempering we moisten the fly ash, preferably stirring it in a heated chamber or receptacle; and this moistened fly ash may then be tempered as above described; or it may be stored in its moistened condition until it is desired to temper it, or it may be mixed with lime (and rosin) and tempered during the mixing.

(4) With some fly ash, particularly where it is moistened and heated before the final tempering, the addition of a surface tension reducing substance, such as glycerine prior to heating and stirring will facilitate the subsequent tempering thereof.

Where desired other materials may be used as coarse aggregates, such aggregates being bonded by the product.

The product obtained by our invention is a stone-like material very finely grained, readily workable, and having a compressive strength of about eight thousand pounds per square inch, water resisting, non-efflorescent, non-shrinking, non-warping, and the shapes will maintain their original dimensions. The product can be produced in various colors if desired by adding a suitable mineral pigment prior to the shaping, and when properly colored it will retain its color permanently. In large heavy shapes the outer portion of the material need only be colored. This can be easily done by partly filling the mold with the uncolored material, and completing the filling thereof with material of the desired color. The physical structure of the product may be changed and altered by the addition to the original mixture of aggregates of different size and colors.

We claim:—

1. The herein described product obtained by mixing fly ash, produced by burning finely divided coal of the bituminous class, an alkaline earth base, and water, and indurating same.

2. The herein described product obtained by mixing fly ash, produced by burning finely divided bituminous coal of the bituminous class, water and lime, shaping the mass, and indurating the shaped mass.

3. The herein described structural material possessing high compressive and tensile strength, produced by mixing slaked fly ash, produced by burning finely divided coal, an alkaline earth base and water, and then indurating the mass.

4. An artificial structural material produced by mixing fly ash, an alkaline earth base and water, shaping the mass, and indurating the shapes with moist heat.

5. An artificial structural material produced by mixing fly ash with an alkaline earth base and water, tempering the mixture, shaping the mass, and indurating the shapes.

6. An artificial structural material produced by dry mixing fly ash and an alkaline earth base, kneading the mixture with water, shaping the mass, and indurating the shapes.

7. An artificial structural material produced by mixing fly ash, an alkaline earth base, an efflorescence preventing substance and water, shaping the mass, and indurating the shapes.

8. An artificial structural material produced by mixing fly ash with an alkaline earth base, an efflorescence preventing substance and water, tempering the mixture, shaping the mass, and indurating the shapes with moist heat.

9. An artificial structural material produced by dry mixing fly ash, an alkaline earth base and an efflorescence preventing substance, kneading the mixture with water, shaping the mass, and indurating the mass.

10. An artificial structural material produced by mixing fly ash, lime and water, shaping the mass, and indurating the shapes in moist heat.

11. An artificial structural material produced by slaking fly ash, mixing it with lime and water, and shaping the mass, and indurating the shapes with moist heat.

12. An artificial structural material produced by dry mixing fly ash and lime, kneading the mixture with water, shaping the mass, and indurating the shapes with moist heat.

13. An artificial structural material produced by mixing fly ash, lime, rosin and water, shaping the mass, and indurating the shapes.

14. An artificial structural material produced by slaking fly ash, mixing it with lime, rosin and water, shaping the mass and indurating the shapes with moist heat.

15. An artificial structural material produced by dry mixing fly ash glass, lime and rosin, kneading the mixture with water, shaping the mass and indurating with moist heat.

16. An artificial structural material produced by tempering fly ash, mixing it with an alkaline earth base and water, shaping the mass, and indurating the shapes.

17. An artificial structural material produced by tempering fly ash, mixing it with an alkaline earth base, an efflorescence preventing substance and water, shaping the mass, and indurating the shapes.

18. An artificial structural material produced by tempering fly ash, mixing it with lime and water, shaping the mass, and indurating the shapes.

19. An artificial structural material produced by slaking fly ash, mixing it with lime, rosin and water, tempering the mass, shaping the mass and indurating the shapes.

20. An artificial structural material produced by tempering fly ash, mixing it with an alkaline earth base and water, tempering the mass, shaping the mass, and indurating the shapes.

21. An artificial structural material produced by tempering fly ash, mixing it with an alkaline earth base, and efflorescence preventing substance and water, tempering the mass, shaping the mass, and indurating the shapes.

22. The process of making an artificial structural material; consisting in mixing fly ash, an alkaline earth base and water, shaping the mass, and indurating the shapes.

23. The process of making artificial structural material; consisting in mixing fly ash with an alkaline earth base and water, tempering the mixture, shaping the mass, and indurating the shapes.

24. The process of producing artificial structural material; consisting in dry mixing fly ash and an alkaline earth base, tempering the mixture with water, shaping the mass, and indurating the shapes.

25. The process of making artificial structural material; consisting in mixing fly ash, an alkaline earth base, and efflorescence preventing substance and water, shaping the mass, and indurating the shapes.

26. The process of making artificial structural material; consisting in mixing fly ash with an alkaline earth base, an efflorescence preventing substance and water, tempering the mixture, shaping the mass, and indurating the shapes with moist heat.

27. The process of producing artificial structural material; consisting in dry mixing fly ash, an alkaline earth base and an efflorescence preventing substance, kneading the mixture with water, shaping the mass, and indurating the mass.

28. The process of making an artificial structural material; consisting in mixing fly ash, lime and water, shaping the mass, and indurating the shapes.

29. The process of making artificial structural material; consisting in slaking fly ash, mixing it with lime and water, and shaping the mass, and indurating the shapes with moist heat.

30. The process of producing artificial structural material; consisting in dry mixing fly ash and lime, kneading the mixture with water, shaping the mass, and indurating the shapes with moist heat.

31. The process of making artificial structural material; consisting in mixing fly ash, lime, rosin and water, shaping the mass, and indurating the shapes.

32. The process of making artificial structural material; consisting in slaking fly ash, mixing it with lime, rosin and water, shaping the mass and indurating the shapes with moist heat.

33. The process of producing artificial structural material; consisting in dry mixing fly ash, lime and rosin, kneading the mixture with water, shaping the mass and indurating with moist heat.

34. The process of making an artificial structural material; consisting in tempering fly ash, mixing it with an alkaline earth base and water, shaping the mass, and indurating the shapes.

35. The process of making artificial structural material; consisting in tempering fly ash, mixing it with an alkaline earth base, an efflorescence preventing substance and water, shaping the mass, and indurating the shapes.

36. The process of making an artificial structural material; consisting in tempering fly ash, mixing it with lime and water, shaping the mass, and indurating the shapes.

37. The process of making artificial structural material; consisting in slaking fly ash, mixing it with lime, rosin and water, tempering the mass, shaping the mass and indurating the shapes.

38. The process of making an artificial structural material; consisting in tempering fly ash, mixing it with an alkaline earth base and water, tempering the mass, shaping the mass, and indurating the shapes.

39. The process of making artificial structural material; consisting in tempering fly ash, mixing it with an alkaline earth base, an efflorescence preventing substance and water, tempering the mass, shaping the mass, and indurating the shapes.

40. The herein described process of making an artificial structural material; consisting in slaking fly ash produced by burning finely divided bituminous coal, mixing same with lime and sufficient water to render the same workable, shaping the mass, and heating the shaped mass while retaining the essential reacting water therein until the mass is transformed into said material.

41. The herein described process of making an artificial structural material; consisting in tempering fly ash produced by burning finely divided bituminous coal, mixing the tempered fly ash with lime and sufficient water to render the same workable, shaping the mass, and heating the shaped mass while retaining the essential reacting water therein until the mass is transformed into said material.

42. The herein described artificial structural material; produced by slaking the fly ash obtained by burning finely divided coal, mixing the slaked fly ash with an alkaline earth base, shaping the mass and indurating the same.

HARRY C. PEFFER.
PAUL W. JONES.